Patented Nov. 6, 1945

2,388,440

UNITED STATES PATENT OFFICE 2,388,440

BETA-CHLOROALLYL ACRYLATES

Chessie E. Rehberg, Wyndmoor, and Charles H. Fisher, Abington, Pa., assignors to United States of America as represented by Claude R. Wickard, Secretary of Agriculture, and his successors in office No Drawing. Application September 25, 1943, Serial No. 503,833

3 Claims. (Cl. 260—486)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

Our invention relates to a process of preparing beta-chloroallyl acrylates and substituted chloroallyl acrylates and polymers and interpolymers thereof.

An object of our invention is the preparation of beta-chloroallyl acrylate and substituted chloroallyl acrylates, such as beta-chloroallyl methacrylate, of relatively high molecular weight and low vapor pressure.

Polymers and interpolymers of beta-chloroallyl acrylate and substituted chloroallyl acrylates have in a controllable degree the properties of fluidity, elasticity, plasticity, tensile strength, electrical resistance, resistance to water, organic liquids and gases, transparency, and so forth, which are properties highly desirable in the group of substances commonly designated as plastics. Owing to the presence of two instead of one olefinic linkage, the beta-chloroallyl acrylates and substituted chloroallyl acrylates have a characteristic not possessed by the simple alkyl acrylates, namely, the ability, when polymerized under suitable conditions, to form cross-linked instead of linear polymers and interpolymers of increased hardness and decreased solubility (M. A. Pollack, I. E. Muskat and F. Strain, U. S. 2,273,891, February 24, 1942). Hence, the beta-chloroallyl acrylates and substituted chloroallyl acrylates are particularly valuable in that they can be used with other unsaturated monomers to prepare interpolymers of any desired degree of cross-linkage, hardness, and insolubility. The presence of the chlorine in the molecule makes the monomer more reactive and improves the hardness, fire resistance, and other desirable plastic properties of the polymers.

It is known that unsaturated hydrocarbons may be produced by the elimination of acetic acid from the acetylated alcohol. For example, 2,4-dimethyl pentene-2 is produced by the pyrolysis of acetylated 2,4-dimethyl pentanol-3 (Van Pelt and Wibaut, Rec. trav. chim. 57, 1055 (1938), 60, 55–64 (1941); Stevens and Richmond. J. Am. Chem. Soc. 63, 3132–6 (1941)). It is also known that unsaturated acids may be formed by the pyrolysis of the acetylated derivatives of poly-carboxylic acids. For example, aconitic ester is produced by pyrolysis of the acetylated citric ester, and maleic anhydride is produced by the pyrolysis of acetylated malic anhydride (Hurd, "Pyrolysis of Carbon Compounds," A. C. S. Monograph 50, New York, Reinhold Publishing Corp., 1929). It is further known that the acetylated methyl ester of lactic acid on pyrolysis produces methyl acrylate, but the ethyl ester and higher alkyl esters tend to undergo pyrolytic decomposition with the formation of an unsaturated hydrocarbon and the corresponding acid (Burns, Jones, and Ritchie, J. Chem. Soc. 1935, 400–6, 714–7; U. S. 2,183,357, December 12, 1939; Smith, Fisher, Ratchford, and Fein, Ind. Eng. Chem. 34, 473–79 (1942); Claborn, U. S. 2,222,363, November 19, 1940; U. S. 2,229,997, January 28, 1941). This tendency increases as the molecular weight of the alkyl group increases. Thus, it has not been possible hitherto to produce satisfactorily alkyl acrylates and methacrylates of relatively high molecular weights and high boiling points by this process.

We have found that the presence of a chlorine atom on the beta-carbon atom of the alcohol group together with an olefinic linkage between the beta- and gamma-carbon atoms Alpha $CH_3.CR(OCO.CH_3).COO.CH_2.CCl:CH_2$ Beta gamma where R is hydrogen or methyl, decreases the undersirable side reactions encountered in pyrolysis of the alkyl alpha-acetoxypropionates and isobutyrates of higher molecular weight, and that, owing to the characteristics of the beta-chloroallyl radical and its esters, its alpha-acyloxy esters can be converted readily and in good yields into the beta-chloroallyl acrylate and substituted chloroallyl acrylates shown below:

$R_1.CR_2(OCO.R_3).COO.CH_2.CCl:CH_2 \xrightarrow{pyrolysis}$ (Beta-chloroallyl alpha-acyloxy ester)

$R_4CH:CR_2.COO.CH_2.CCl:CH_2$ (Beta-chloroallyl acrylate or substituted acrylate)

where $R_1$ is an alkyl group and $R_2$, $R_3$, and $R_4$ are hydrogen or an alkyl group.

Transformation of the beta-chloroallyl alpha-acyloxy esters into the corresponding acrylates or substituted acrylates is effected conveniently by passing vapors of the acyloxy esters through a pyrolysis tube, usually packed in the heated zone with quartz chips or similar contact material maintained at 400° to 600° C. Below 400° C. the conversion is slow, whereas at temperatures above 600° C. excessive decomposition into undesired by-products occurs.

Although the examples given below mention only the actyl derivatives of beta-chloroallyl alpha-hydroxy esters, other similar derivatives, such as the propionyl and benzoyl derivatives (propionates, benzoates) can also be used.

By way of illustration, our process is carried out in the following manner.

The substances formed as intermediate products in Step 1 and Step 2 below are the subject of a copending application for patent Serial No. 503,834, filed Sept. 25, 1943.

Step 1.—The conversion of alpha-hydroxy acids and beta-chloroallyl alcohol into beta-chloroallyl alpha-hydroxy esters by esterification, in accordance with the reaction:

where $R_1$ and $R_2$ are hydrogen or an alkyl group.

Step 2.—The conversion of beta-chloroallyl alpha-hydroxy esters into alpha-acyloxy esters by esterification of the alpha-alcoholic hydroxyl group of the hydroxy-esters with acetic anhydride, ketene or other acylating agent. The reaction when ketene is used as the esterifying agent is:

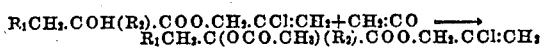

where $R_1$ and $R_2$ are hydrogen or an alkyl group.

Step 3.—The conversion of beta-chloroallyl alpha-acyloxy esters into beta-chloroallyl acrylate or substituted chloroallyl acrylate by means of pyrolytic decomposition, in accordance with the reaction:

where $R_1$ is an alkyl group and $R_2$, $R_3$ and $R_4$ are hydrogen or an alkyl group.

Step 4.—The conversion of beta-chloroallyl acrylate or substituted chloroallyl acrylate into polymers and interpolymers of more or less complexity and magnitude by means of heat or other aids to polymerization.

The following examples describe in detail a preferred procedure for making the acrylates and substituted acrylates mentioned above and their polymers.

Example I

Step 1.—Chloroallyl lactate was prepared as described below (and as disclosed in a copending application for patent mentioned above):

Four moles (450 g.) of 80 percent aqueous lactic acid, 12 moles (1110 g.) of beta-chloroallyl alcohol and 3 g. of p-toluenesulfonic acid were refluxed in a flask carrying a 3-foot fractionating column having at its top a condenser and a trap for continuously separating and removing the aqueous layer of the condensate and returning the alcohol layer to the top of the fractionating column. When no more water was produced and removed from the reaction mixture, sufficient anhydrous sodium acetate was added to neutralize the acid catalyst and the mixture was fractionally distilled. The unreacted alcohol was removed at about 50° C. (20 mm.) after which the lactate was distilled at 64°–70° C. (2 mm.). The yield was 505 g., or 76 percent of the theoretical amount. The crude ester was bright yellow but upon redistillation the pure, water-white ester was obtained at 103° C. (20 mm.). This product developed a yellow color after long standing in a clear bottle in a light room.

Step 2.—The acetylation of beta-chloroallyl lactate was achieved by heating 1.5 moles (247 g.) to 100° C. and slowly adding thereto 1.65 moles (168 g.) of acetic anhydride containing 5 drops of sulfuric acid. After maintaining the mixture at 100°–110° C. for one hour, sufficient sodium acetate to react with the sulfuric acid was added and the mixture was fractionated. The beta-chloroallyl alpha-acetoxypropionate, which was collected at 95°–97° C. (5 mm.), amounted to 236 g. or 92 percent of the theoretical.

Step 3.—Beta-chloroallyl alpha-acetoxypropionate (116.4 g.) was allowed to run at a rate of 60 drops per minute (contact time approximately 8.3 seconds) into a Pyrex tube 30 cm. long and 2.5 cm. outside diameter, and filled with Pyrex fragments. The tube was heated by an electric furnace; the temperature of the furnace was maintained at 525° C. and recorded automatically. The glass pyrolysis tube was provided at the top with a dropping funnel and pressure equalizer for adding the liquid reagent at constant rate. The apparatus was swept out with nitrogen before the reaction was started and a slow current of nitrogen was passed through continuously during the course of the reaction. A small amount of hydroquinone was added to the condensate to prevent premature polymerization. The condensate (97.9 g.) was fractionally distilled under reduced pressure; 24 g. (mainly beta-chloroallyl acrylate) was collected at 55° to 75° C. under 16 mm. pressure. Some of the starting material (37.7 g.) was recovered by distillation as a high-boiling fraction. Redistillation of the acrylate, after adding 0.2 g. of hydroquinone, yielded pure beta-chloroallyl acrylate boiling at 58° to 60° C. under 15 mm. pressure. The yield of beta-chloroallyl acrylate based on the 78.7 g. of starting material consumed was 43 percent of the theoretical.

Beta-chloroallyl acrylate is a clear, colorless mobile liquid, having a boiling point of 58° to 60° C. under 15 mm. pressure, a density of 1.1205 g. per cc. at 20° C. and a refractive index of 1.4582 at 20° C.

Step 4.—When it is desired to polymerize beta-chloroallyl acrylate, the ester is first separated from the hydroquinone or other inhibitor, conveniently by distillation under reduced pressure. The ester is then polymerized in a known manner in a vessel or mold of the shape desired. If it is desired to prepare the polymer in the interstices of fabrics or on the surface of paper or leather, various proportions of ethyl acetate or other suitable low-boiling diluent can be added, the ester partially polymerized, and the mixture applied to the fabric or other material in a thin layer. The solvent is allowed to evaporate and the resulting film is heated at moderate temperature for several hours to remove traces of solvent and to complete the polymerization.

High-boiling liquids miscible with the acrylate, such as diamyl phthalate, may be added as plasticizers or softening agents. Miscible polymerizable substances, such as other acrylates or methylacrylates, may be mixed with beta-chloroallyl acrylate and the mixtures subjected to polymerization influence. Polymerization catalysts, such as benzoyl peroxide, may be used instead of heat to expedite polymerization. Irradiation with ultra-violet light is also effective.

Beta-chloroallyl acrylate when polymerized alone yields a relatively hard, insoluble and infusible resin. Polymerization of a solution consisting of 5 percent beta-chloroallyl acrylate and 95 percent methyl acrylate yielded a polymer that was harder and tougher than the resin obtained by polymerizing methyl acrylate alone.

Having thus described our invention, we claim:

1. The process which comprises pyrolyzing a beta-chloroallyl ester of alpha-acetoxy isobutyric acid to form the corresponding acrylate.

2. The process which comprises pyrolyzing a beta-chloroallyl ester of alpha-acetoxy propionic acid to form the corresponding acrylate.

3. The process which comprises pyrolyzing a beta-chloroallyl ester of the type corresponding to $$CH_3.CR_2(OCO.CH_3).COO.CH_2CCl:CH_2$$

where $R_2$ is a member selected from the group consisting of hydrogen and methyl, under suitable conditions of temperature and time to form the corresponding acrylate.

CHESSIE E. REHBERG.
CHARLES H. FISHER.